United States Patent
Cusey et al.

(10) Patent No.: US 9,900,953 B2
(45) Date of Patent: Feb. 20, 2018

(54) TEMPERATURE COMPENSATION IN OPTICAL SENSING SYSTEM

(71) Applicant: TT Electronics Plc, Carrollton, TX (US)

(72) Inventors: James P. Cusey, Dallas, TX (US); Alain Potteck, Montreal (CA); Tri-Tue Truong, Ville Mont-Royal (CA)

(73) Assignee: TT ELECTRONICS PLC, Carrollton, TX (US)

( * ) Notice: Subject to any disclaimer, the term of this patent is extended or adjusted under 35 U.S.C. 154(b) by 0 days.

(21) Appl. No.: 15/168,858

(22) Filed: May 31, 2016

(65) Prior Publication Data
US 2017/0347419 A1 Nov. 30, 2017

(51) Int. Cl.
*H05B 33/08* (2006.01)
*G01J 1/42* (2006.01)
*G01J 1/02* (2006.01)

(52) U.S. Cl.
CPC ........ *H05B 33/0854* (2013.01); *G01J 1/0252* (2013.01); *G01J 1/42* (2013.01); *H05B 33/0848* (2013.01)

(58) Field of Classification Search
None
See application file for complete search history.

(56) References Cited

U.S. PATENT DOCUMENTS

| | | | |
|---|---|---|---|
| 3,705,316 A | 12/1972 | Burrous et al. | |
| 6,420,911 B1 * | 7/2002 | Warmerdam | G05F 1/561 323/316 |
| 6,460,765 B1 | 10/2002 | Priesbsch | |
| 7,286,123 B2 | 10/2007 | Yang | |
| 7,509,113 B2 | 3/2009 | Knoedgen | |
| 7,573,922 B2 * | 8/2009 | Kamatani | H01S 5/042 372/38.01 |
| 8,264,171 B1 * | 9/2012 | Domer | H05B 33/0854 315/291 |
| 2007/0171146 A1 | 7/2007 | Lee et al. | |
| 2014/0009072 A1 * | 1/2014 | Sun | H05B 37/02 315/158 |
| 2016/0044760 A1 | 2/2016 | Robert | |

OTHER PUBLICATIONS

Amanpreet Kaur et al., "Current Mode Computational Circuits for Analog Signal Processing," www.ijareeie.com, vol. 3, Issue 4, Apr. 2014, 9 pages.

* cited by examiner

*Primary Examiner* — Douglas W Owens
*Assistant Examiner* — James H Cho
(74) *Attorney, Agent, or Firm* — Haynes and Boone, LLP (57) ABSTRACT

A temperature compensation circuit for a light source (e.g., light emitting diode (LED)) whose radiant energy output decreases when ambient temperature increases includes a first circuit element for generating a first current that increases proportional to an increase in the ambient temperature, and a second circuit element for generating a second current that is first order independent of the ambient temperature. The circuit further includes a weighted current adder for generating a third current by combining the first and second currents with first and second weights applied to the first and second currents respectively. The circuit further includes a third circuit element responsive to the third current for supplying a fourth current to the light source to maintain a radiant energy output of the light source constant independent of the ambient temperature.

20 Claims, 9 Drawing Sheets

TEMPERATURE COMPENSATION IN OPTICAL SENSING SYSTEM

BACKGROUND

Light emitting diodes (LEDs) have been widely used in applications such as card reading, character recognition, proximity sensing, label printing, electro-optical switching, and so on. In particular, LEDs have been used in conjunction with photodiodes in optical sensing systems. For example, an optical sensing system may drive an LED to produce certain radiant energy. This radiant energy is received by a photodiode after going through a medium or being reflected by a surface. The photodiode converts the received radiant energy to electrical current which is further processed for detecting, for example, the existence of the medium or the surface.

In the above optical sensing system, a resolution of sensing (e.g., the ability to differentiate between one and two pieces of thin paper) depends on multiple factors. One of the factors is the ability of the LED to maintain its radiant energy output (or optical output power) generally constant across a range of ambient temperatures that the optical sensing system is operated at. Unfortunately, the radiant energy output of most LEDs changes considerably with ambient temperature. Particularly, the radiant energy output of most LEDs decreases considerably when temperature increases if the input current to the LEDs stays the same. Such variation generally cannot be tolerated in conventional high-resolution optical sensing systems. Accordingly, improvements in this area are desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. Any alterations and further modifications to the described devices, systems, methods, and any further application of the principles of the present disclosure are fully contemplated as would normally occur to one having ordinary skill in the art to which the disclosure relates. For example, the features, components, and/or steps described with respect to one embodiment may be combined with the features, components, and/or steps described with respect to other embodiments of the present disclosure to form yet another embodiment of a device, system, or method according to the present disclosure even though such a combination is not explicitly shown. Further, for the sake of simplicity, in some instances the same reference numerals are used throughout the drawings to refer to the same or like parts.

The present disclosure is generally related to optical sensing systems and methods, more particularly to circuits, systems, and methods for compensating a light source of an optical sensing system to work under a range of operation temperatures. An object of the present disclosure is to provide a temperature-compensated light source whose radiant energy output remains generally constant across a range of operation temperatures. Another object of the present disclosure is to provide an LED-drive circuit that can work with most existing LEDs through a calibration procedure. Once calibrated, the LED-drive circuit is operative to produce a current that complements the given LED such that the LED's output power remains generally constant when ambient temperature changes. Yet another object of the present disclosure is to provide a calibration method that can be implemented in an optical sensing system to achieve the aforementioned temperature compensation.

Figure 1:
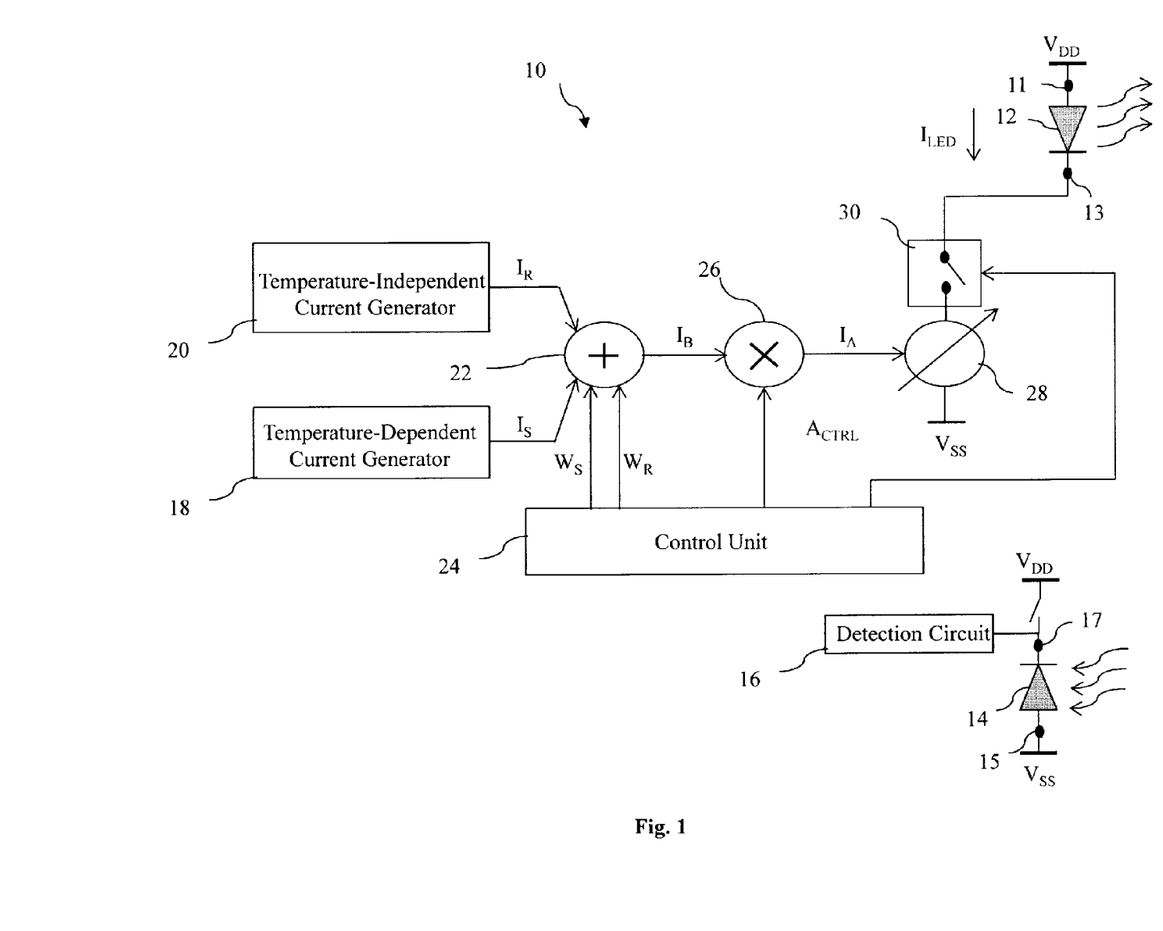
FIG. 1 is a simplified block diagram of an optical sensing system according to aspects of the present disclosure.

Referring to FIG. 1, shown therein is a schematic partial view of an optical sensing system 10 constructed according to an embodiment of the present disclosure. The optical sensing system 10 includes an LED 12 whose anode 11 is coupled to a supply voltage $V_{DD}$ and whose cathode 13 is coupled to a current source 28 through a switch 30 (further discussed later). A forward current $I_{LED}$ goes through the LED 12 and causes it to produce a light (or radiant energy). The LED 12 may produce visible light or invisible light, including ultraviolet light and infrared light. The LED 12 may comprise any suitable semiconductor materials such as gallium arsenide (GaAs), gallium phosphide (GaP), aluminum gallium arsenide (AlGaAs), gallium arsenide phosphide (GaAsP), indium gallium nitride (InGaN), aluminum gallium phosphide (AlGaP), and aluminum gallium indium phosphide (AlGaInP).

The optical sensing system 10 further includes a photodiode 14 whose anode 15 is connected to ground ($V_{SS}$) and whose cathode 17 is connected to a switch (e.g., a reset switch) which is connected to the supply voltage $V_{DD}$. The photodiode 14 receives at least a part of the radiant energy of the LED 12, for example, through reflection off a surface, diffraction by a medium, or transmission through a medium. In response, the photodiode 14 produces a current from its cathode 17 to its anode 15. This current is sensed by a detection circuit 16 for further processing.

A characteristic of the LED 12 is that if the current $I_{LED}$ remains constant, its radiant energy output decreases when ambient temperature increases. Such variation with ambient temperature affects the ability of the photodiode 14 and the detection circuit 16 to detect the radiant energy reliably. As a result, the sensitivity of the photodiode 14 is limited by how much variation there is in the LED 12's radiant energy output. For applications that operate across a wide range of ambient temperatures (e.g., commercial grade temperature range from 0° C. to 70° C., industrial grade temperature range from −40° C. to 85° C., or military grade temperature range from −55° C. to 125° C.), it is highly desirable to keep the LED 12's radiant energy output constant or generally constant (e.g., within few percent) across the operation temperatures. The present disclosure provides solutions to such problem as further discussed below.

Still referring to FIG. 1, the optical sensing system 10 further includes a module 18 that is a temperature-dependent current generator and a module 20 that is temperature-independent current generator. The module 18 is operative to produce a current $I_S$. The module 20 is operative to produce a current $I_R$. In the present embodiment, the current $I_S$ increases (or decreases) in response to an increase (or a decrease) in ambient temperature. In a further embodiment, the current $I_S$ increases (or decreases) first order linearly when ambient temperature increases (or decreases). In the present disclosure, the term "first order linearly" means that the current $I_S$ can be modeled in equation (1) below as a linear equation of absolute temperature T and any second or higher order effects of temperature T can be ignored when temperature is within a defined range such as within an expected operating range. The same definition of "first order linearly" applies to the discussion of other variables and circuit parameters including voltage, current, power, and resistance.

$$I_S = mT + I_0, \text{ where } m \text{ and } I_0 \text{ are constant and } m>0 \quad (1)$$

In contrast, the current $I_R$ is first order independent of ambient temperature, i.e., it remains relatively constant across an operation range of ambient temperatures and any second or higher order effects of ambient temperature can be ignored.

The optical sensing system 10 further includes a current adder (or a current-mode adder) 22. The current adder 22 is operative to produce a current $I_B$ which is a weighted sum of the currents $I_S$ and $I_R$. In the present embodiment, the current adder 22 applies a first weight $W_S$ to the current $I_S$ and a second weight $W_R$ to the current $I_R$. Therefore, the current $I_B$ can be expressed in equation (2) below:

$$I_B = W_S I_S + W_R I_R \quad (2)$$

In the present embodiment, the weights $W_S$ and $W_R$ are provided by a control unit 24 and each of them is a multi-bit vector. In some examples, the control unit 24 is an application-specific integrated circuit (ASIC) or other processor circuit operable to read computer executable instructions from a memory element and to provide the functionality described herein by executing the instructions. In an embodiment, the weights $W_S$ and $W_R$ are user-programmable for fine-tuning (or calibrating) the current $I_B$. As can be seen from the equations (1) and (2) above, the current $I_B$ is a linear equation of absolute temperature T with a positive slope. Further, its temperature dependence is in between that of $I_S$ and $I_R$ when $W_S$ and $W_R$ are normalized to a sum of one. For a given LED 12, a user may adjust the values of $W_S$ and $W_R$ to derive a proper $I_B$ which complements the temperature-dependence of LED 12. In other words, it causes the radiant energy output of LED 12 to remain generally constant across the operation range of ambient temperatures.

Once proper values of $W_S$ and $W_R$ are found (or calibrated), such values may be stored in a non-volatile memory (e.g., as digital bits in control unit 24). This provides advantages that the optical sensing system 10 can resume proper operation after power-off and power-on without a need of repeating the calibration procedure.

Still referring to FIG. 1, in the present embodiment, the optical sensing system 10 further includes a current multiplier 26 that multiplies the current $I_B$ with a control vector $A_{CTRL}$ and produces a current $I_A$ as follows:

$$I_A = A_{CTRL} I_B \quad (3)$$

The control vector $A_{CTRL}$ is provided by the control unit 24 in the present embodiment. In applications, a user may manually or automatically step through a set of values of the $A_{CTRL}$, which in turn produces a set of optical output power at the LED 12. This may be used for calibrating the LED 12 and the photodiode 14 to find a desirable working condition for the optical sensing system 10. In an embodiment, once the LED 12 and the photodiode 14 are calibrated at a nominal temperature (e.g., at room temperature), the value of $A_{CTRL}$ is stored in a non-volatile memory and is used by the optical sensing system 10 in subsequent operations.

In an embodiment, the current source 28 is a current mirror that copies the current $I_A$ to the electrical path of the LED 12. In effect, $I_{LEA}$ equals to $I_A$ when the switch 30 is turned on (or closed). The temperature-dependence of $I_A$ complements that of the LED 12. In an embodiment, the switch 30 is controlled to turn on and off to pulse the LED 12 periodically. For example, the LED 12 may be turned on for 200~300 nanoseconds (ns) with a period of 1 to 2 microseconds (μs).

Figure 2A:
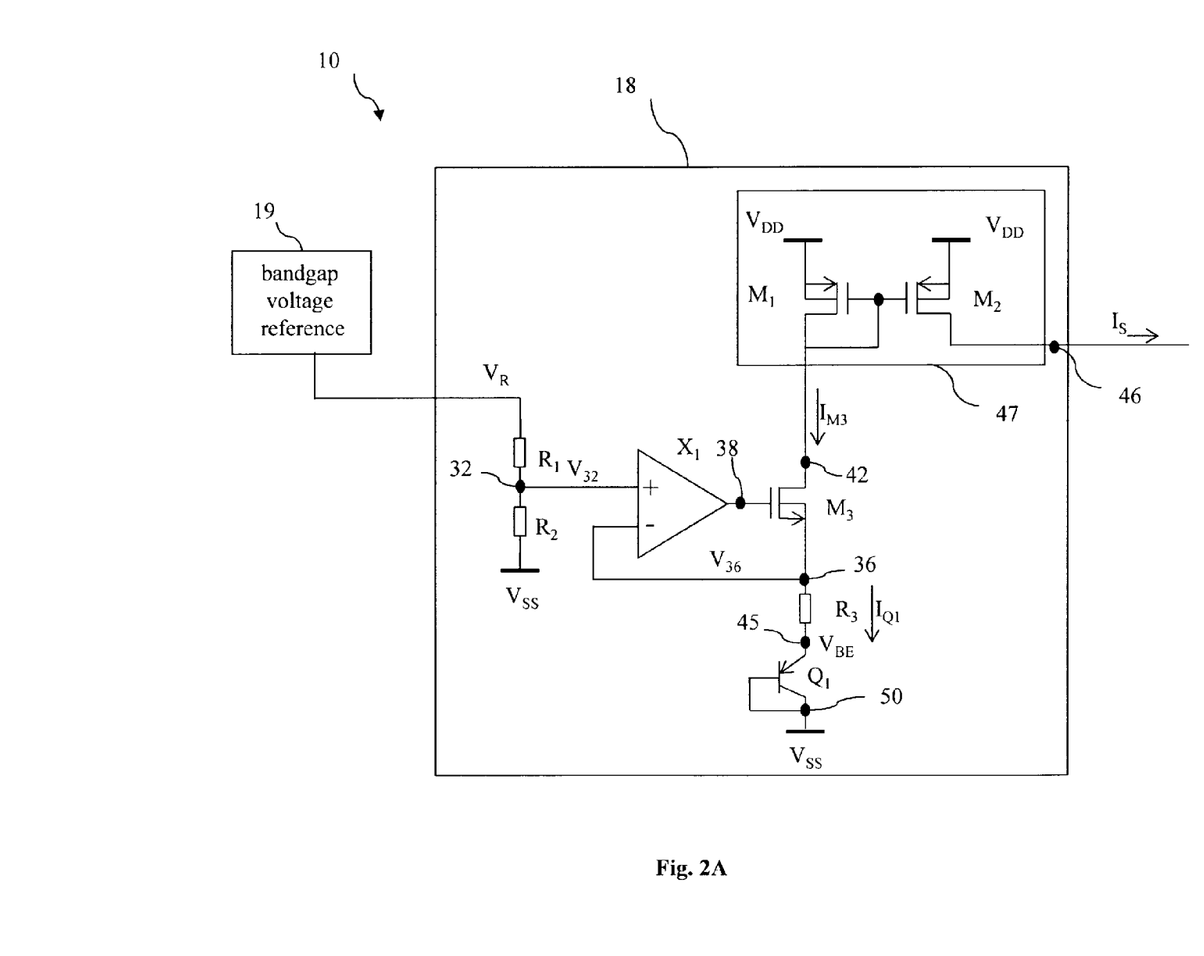
FIG. 2A is a partial schematic view of the optical sensing system in FIG. 1 including a current source module, in accordance with an embodiment.

Referring to FIG. 2A, the optical sensing system 10 further includes a bandgap voltage reference 19 which is operative to provide a voltage potential $V_R$. The voltage $V_R$ is first order independent of ambient temperature. The voltage $V_R$ is supplied to the current generator 18 (FIGS. 2A and 2B) and the current generator 20 (FIG. 3) as a reference voltage.

Still referring to FIG. 2A, an embodiment of the temperature-dependent current generator 18 is schematically illustrated. The current generator 18 includes a bipolar transistor $Q_1$. In this embodiment, the bipolar transistor $Q_1$ is a PNP transistor whose emitter is coupled to a node 45 and whose base and collector are coupled to a node 50. In the present embodiment, the node 50 is grounded (i.e., coupled to the ground potential $V_{SS}$). The voltage potential $V_{BE}$ at the node 45 is inversely proportional to ambient temperature in the first order. In other words, the voltage $V_{BE}$ can be modeled as a linear equation (4) of absolute temperature T and any second or higher order effects of temperature T can be ignored when temperature is within a defined range such as within an expected operating range.

$$V_{BE} = -nT + V_0, \text{ where } n \text{ and } V_0 \text{ are constant and } n>0 \quad (4)$$

The current generator 18 further includes resistors $R_1$ and $R_2$ that are connected in series between the reference voltage $V_R$ and the ground $V_{SS}$. The resistors $R_1$ and $R_2$ are coupled to a common node 32. Resistance values of the resistors $R_1$ and $R_2$ are first order independent of ambient temperature. Therefore, a voltage potential $V_{32}$ at the node 32 is first order independent of ambient temperature and can be expressed in equation (5) below.

$$V_{32} = kV_R, \text{ where } k = R_2/(R_1 + R_2) \text{ and } 0 < k \leq 1 \quad (5)$$

The current generator 18 further includes an operational amplifier $X_1$. The operational amplifier $X_1$ has a non-inverting input terminal coupled to the node 32, an inverting input terminal coupled to a node 36, and an output terminal coupled to a node 38. The current generator 18 further includes a field effect transistor (FET) $M_3$ whose gate is coupled to the node 38, whose source is coupled to the node 36, and whose drain is coupled to a node 42. A negative feedback path for the operational amplifier $X_1$ is formed from the node 38 to the node 36 via the FET $M_3$. When the current generator 18 reaches equilibrium during operation, a voltage potential $V_{36}$ at the node 36 equals to the voltage potential $V_{32}$ due to the negative feedback path.

$$V_{36} = V_{32} \tag{6}$$

The current generator 18 further includes a resistor $R_3$ coupled between the node 36 and the node 45. A resistance value of the resistor $R_3$ is first order independent of ambient temperature. A current $I_{Q1}$ through the resistor $R_3$ can be expressed in equation (7) below.

$$I_{Q1} = (V_{36} - V_{BE})/R_3 \tag{7}$$

Combining equations (4)-(7) results in equation (8) below.

$$I_{Q1} = \frac{n}{R_3} T + (kV_R - V_0)/R_3 \tag{8}$$

As can be seen from equation (8), the current $I_{Q1}$ is a linear equation of temperature T in the first order with a positive slope. In other words, the current $I_{Q1}$ increases first order linearly when ambient temperature T increases.

Still referring to FIG. 2A, due to high impedance of the input terminals of the operational amplifier $X_1$, a current $I_{M3}$ sourced by the transistor $M_3$ practically equals to the current $I_{Q1}$. The current generator 18 further includes a current mirror 47 that copies the current $I_{M3}$ to an output current $I_S$ at an output node 46. The current $I_S$ can be expressed in equation (9) below:

$$I_S = I_{M3} = I_{Q1} = \frac{n}{R_3} T + (kV_R - V_0)/R_3 \tag{9}$$

As can be seen from equation (9), the current generator 18 is operative to produce the current $I_S$ that increases first order linearly when ambient temperature T increases.

In the embodiment shown in FIG. 2A, the current mirror 47 has two FETs $M_1$ and $M_2$ coupled at their gate terminals. In alternative embodiments, the current mirror 47 may be implemented using bipolar transistors or FETs (such as metal oxide FETs) and may be implemented using any architecture.

Figure 2B:
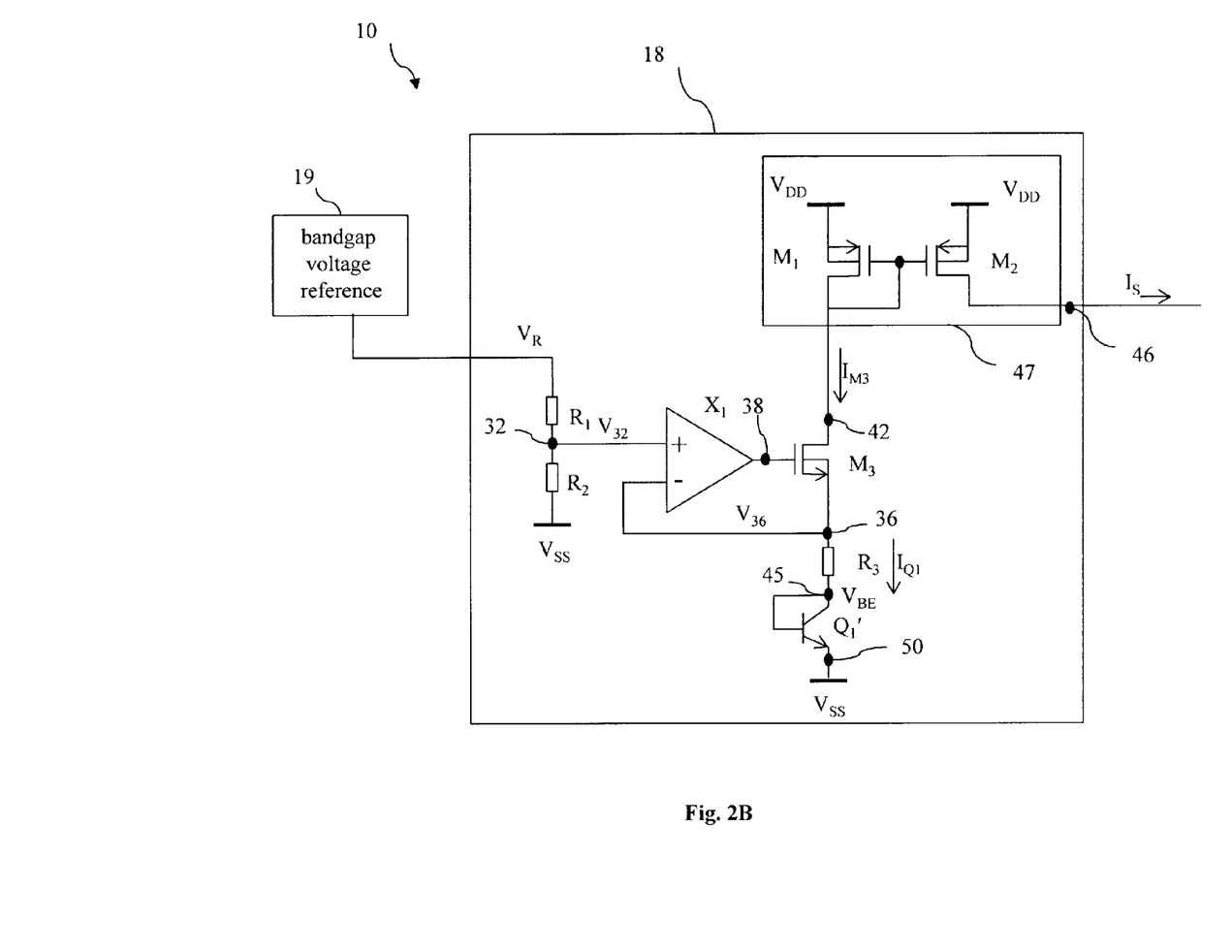
FIG. 2B is a partial schematic view of the optical sensing system in FIG. 1 including a current source module, in accordance with another embodiment.

Referring to FIG. 2B, shown therein is another embodiment of the current generator 18. This embodiment has essentially the same components as the embodiment shown in FIG. 2A except that this embodiment uses an NPN bipolar transistor $Q_1'$ instead of the PNP bipolar transistor $Q_1$. The emitter of the transistor $Q_1'$ is coupled to the node 50 which is grounded in this embodiment. The base and collector of the transistor $Q_1'$ are coupled to the node 36. The circuit analysis of this embodiment may be performed in the same way above.

Figure 3:
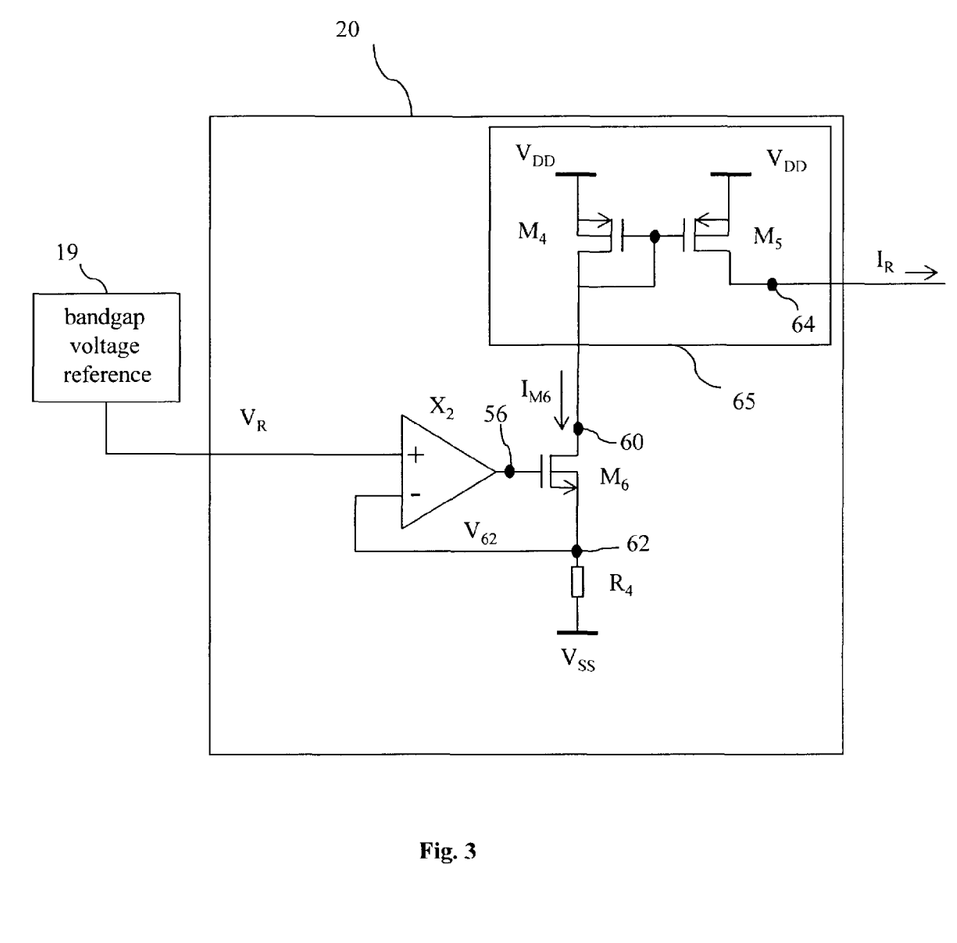
FIG. 3 is a partial schematic view of the optical sensing system in FIG. 1 including another current source module, in accordance with an embodiment.

Referring to FIG. 3, an embodiment of the temperature-independent current generator 20 is schematically illustrated. The current generator 20 includes an operational amplifier $X_2$ whose non-inverting input terminal is coupled to the reference voltage $V_R$, whose inverting input terminal is coupled to a node 62, and whose output terminal is coupled to a node 56. The current generator 20 further includes a resistor $R_4$ coupled between the node 62 and the ground potential $V_{SS}$. A resistance value of the resistor $R_4$ is first order independent of ambient temperature. The current generator 20 further includes a FET $M_6$ whose gate is coupled to the node 56, whose source is coupled to the node 62, and whose drain is coupled to a node 60 for producing a current $I_{M6}$. The current generator 20 further includes a current mirror 65 that copies the current $I_{M6}$ to an output current $I_R$. The current mirror 65 has two FETs $M_4$ and $M_5$ in this embodiment. In alternative embodiments, the current mirror 65 may be implemented using bipolar transistors or FETs (such as metal oxide FETs) and may be implemented using any architecture.

When the current generator 20 reaches equilibrium during operation, a voltage potential $V_{62}$ at the node 62 equals to the voltage potential $V_R$ due to the negative feedback path from the node 56 to the node 62. For practical purposes, the following holds true:

$$I_R = I_{M6} = V_{62}/R_4 = V_R/R_4 \tag{10}$$

As shown in equation (10), the current generator 20 is operative to produce the current $I_R$ that is first order independent of ambient temperature.

Figure 4:
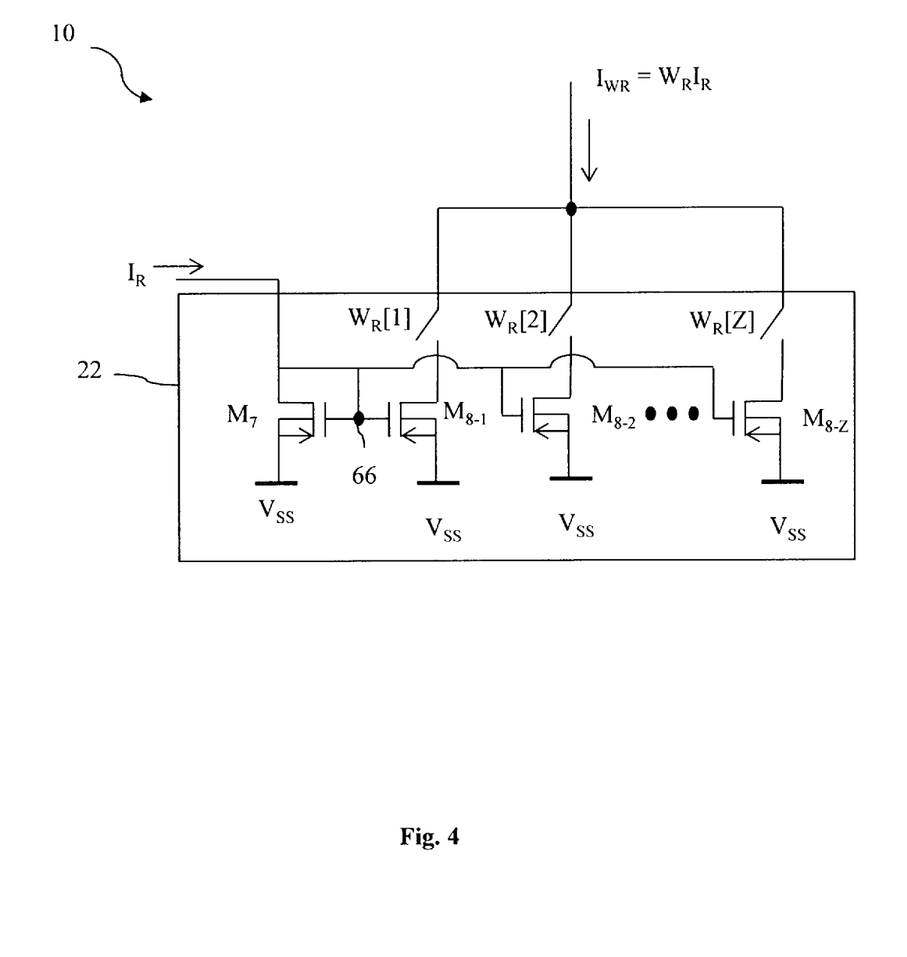
FIG. 4 is a partial schematic view of a weighted current adder of the optical sensing system in FIG. 1, in accordance with an embodiment.

Referring to FIG. 4, an exemplary embodiment of the weighted current adder 22 is partially illustrated. Particularly, FIG. 4 illustrates the applying of weight $W_R$ to the current $I_R$. The current adder 22 includes a FET $M_7$ for receiving an input current $I_R$ and a plurality of FETs, $M_{8-1}$, $M_{8-2}$, ... $M_{8-i}$ ... and $M_{8-Z}$, for sourcing an output current $I_{WR}$. In embodiments, Z may be any integer greater than zero (0). Each of the plurality of FETs $M_{8-i}$ (i in [1:Z]) has its gate terminal coupled to the gate terminal of the FET $M_7$ via a node 66. Essentially, each of the plurality of FETs $M_{8-i}$ is operative to copy the input current $I_R$. Further, each of the plurality of FETs $M_{8-i}$ is connected to a switch that is controlled by one of the bits in the vector $W_R[1:Z]$. The current adder effectively produces $I_{WR} = W_R \cdot I_R$.

The weighted current adder 22 may include similar circuit for applying the weight $W_S$ to the current $I_S$, thereby producing a weighted current $I_{WS} = W_S \cdot I_S$.

The weighted current adder 22 may further include a circuit operative to combine $I_{WR}$ and $I_{WS}$ to produce the current $I_B$ such that:

$$I_B = I_{WR} + I_{WS} = W_R \cdot I_R + W_S \cdot I_S \tag{11}$$

In various embodiments, the weighted current adder 22 may be implemented in any architecture. In similar fashion, the current multiplier 26 may be implemented to produce the current $I_A$ such that:

$$I_A = A_{CTRL} \cdot I_B = A_{CTRL} \cdot (W_R \cdot I_R + W_S \cdot I_S) \tag{12}$$

Figure 5:
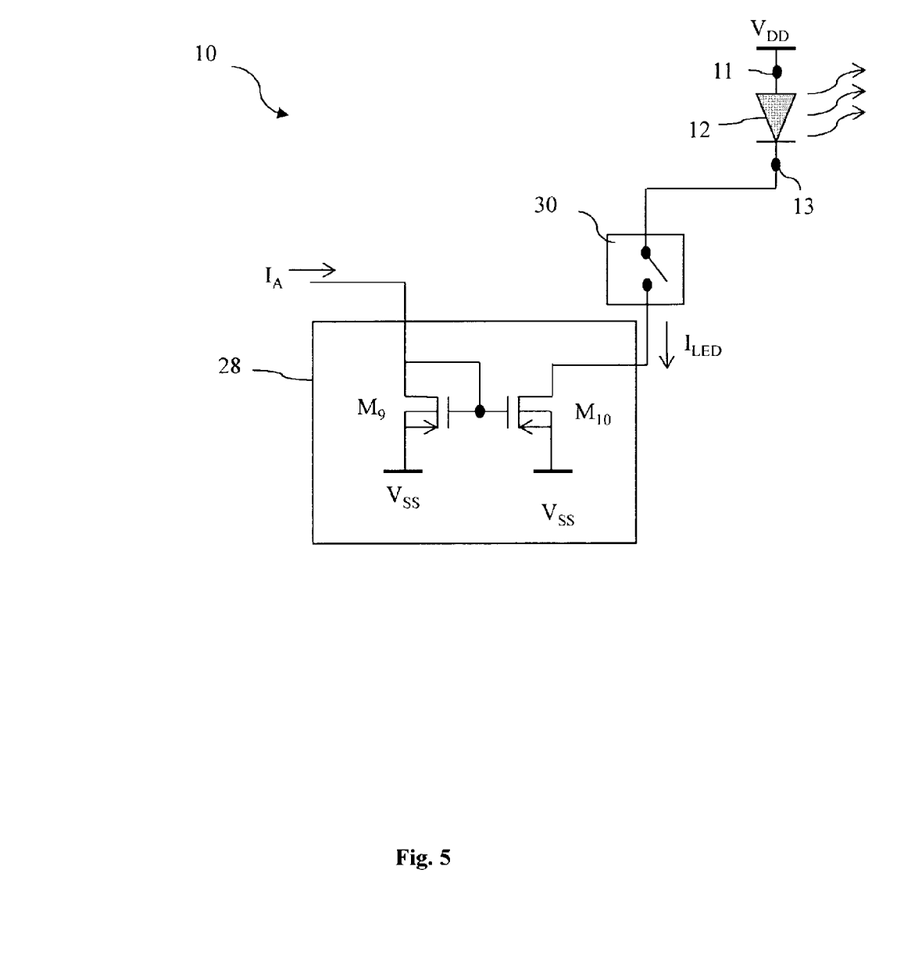
FIG. 5 is a partial schematic view of the optical sensing system in FIG. 1, in accordance with an embodiment.

Referring to FIG. 5, an exemplary embodiment of the current source 28 is partially illustrated, together with the switch 30 and the LED 12. In this embodiment, the current source 28 is a current mirror having FETs $M_9$ and $M_{10}$. The current mirror is operative to copy its input current $I_A$ to its output current $I_{LED}$ when the switch 30 is closed. The current source 28 may be implemented in any architecture in alternative embodiments.

Figure 6A:
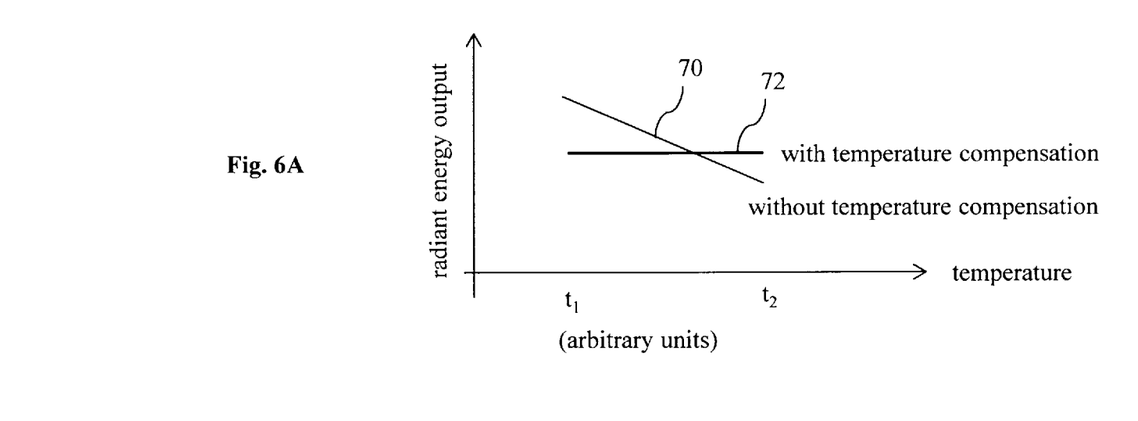
FIGS. 6A and 6B illustrate some operations of the optical sensing system in FIG. 1, in accordance with an embodiment.
Figure 6B:
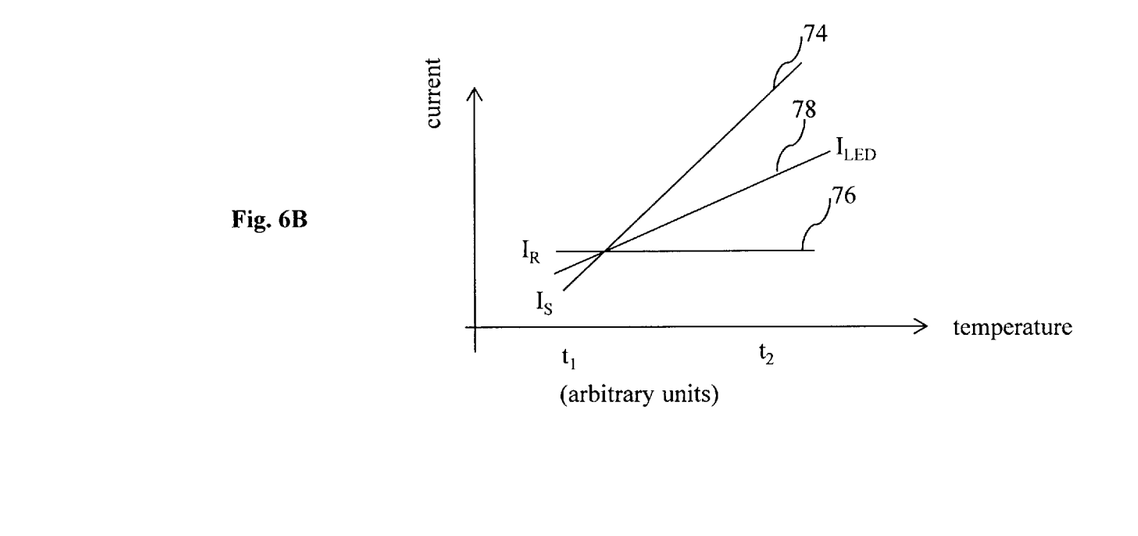

FIGS. 6A and 6B illustrate some operations of the optical sensing system 10 in accordance with an embodiment of the present disclosure. Referring to FIG. 6A, curve 70 illustrates the radiant energy output of the LED 12 (at a given fixed input current) as a function of ambient temperature before being temperature-compensated. The radiant energy output of the LED 12 decreases as the ambient temperature increases from temperature $t_1$ to temperature $t_2$.

Referring to FIG. 6B, a relationship among the currents $I_S$, $I_R$, and $I_{LED}$ is illustrated. The current $I_S$ increases first order linearly with ambient temperature (curve 74). The current $I_R$ is first order independent of ambient temperature (curve 76). The current $I_{LED}$ increases first order linearly with ambient temperature (curve 78). In an example, the various components of the LED drive circuit in FIG. 1 as well as the control vectors $W_S$, $W_R$, and $A_{CTRL}$ are selected such that the curve 78 complements the curve 70.

FIG. 6A further illustrates the radiant energy output of the LED 12 after being temperature-compensated using $I_{LED}$, which is shown in curve 72. The radiant energy output of the LED 12 remains constant or near constant (e.g., variation is within a user-selected threshold) as ambient temperature increases from temperature $t_1$ to temperature $t_2$. This overcomes the temperature-dependence issues discussed earlier.

Figure 7:
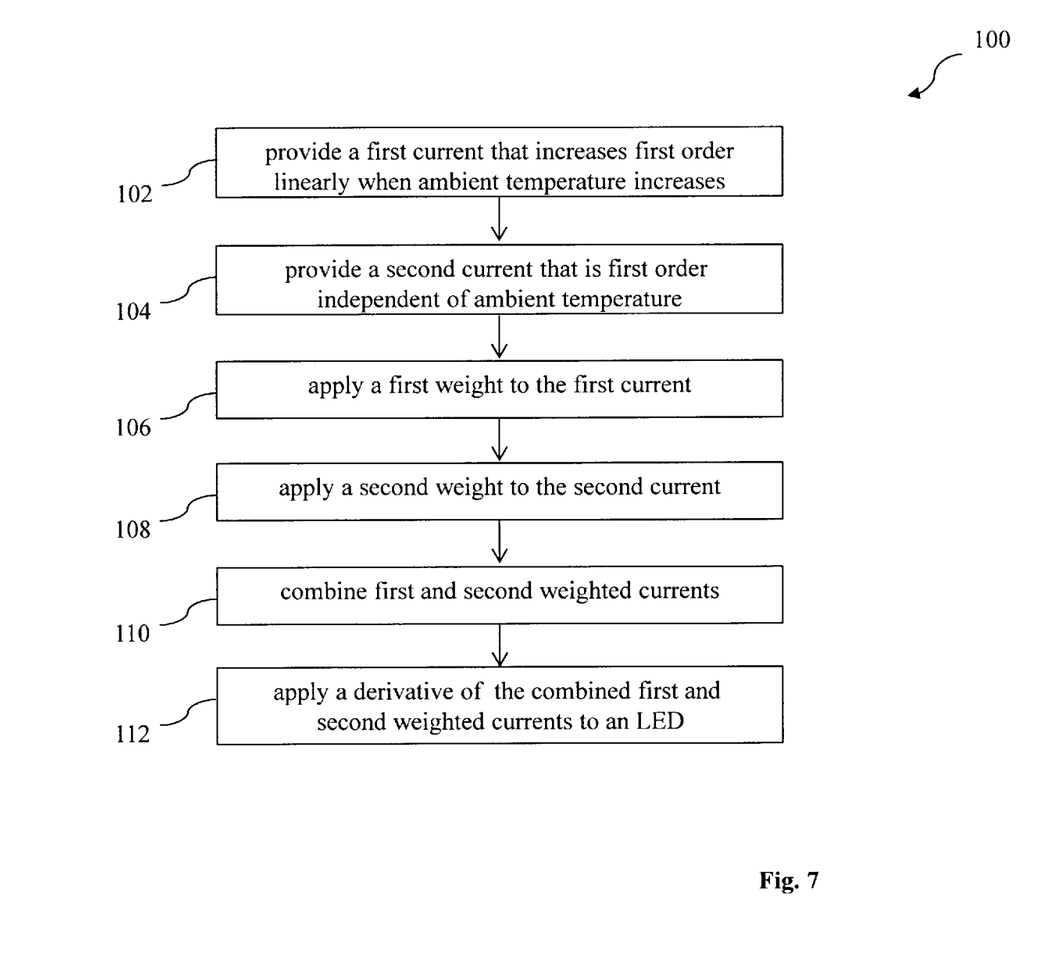
FIG. 7 shows a flow chart of a method of compensating an LED of the optical sensing system in FIG. 1, in accordance with an embodiment.
Figure 8:
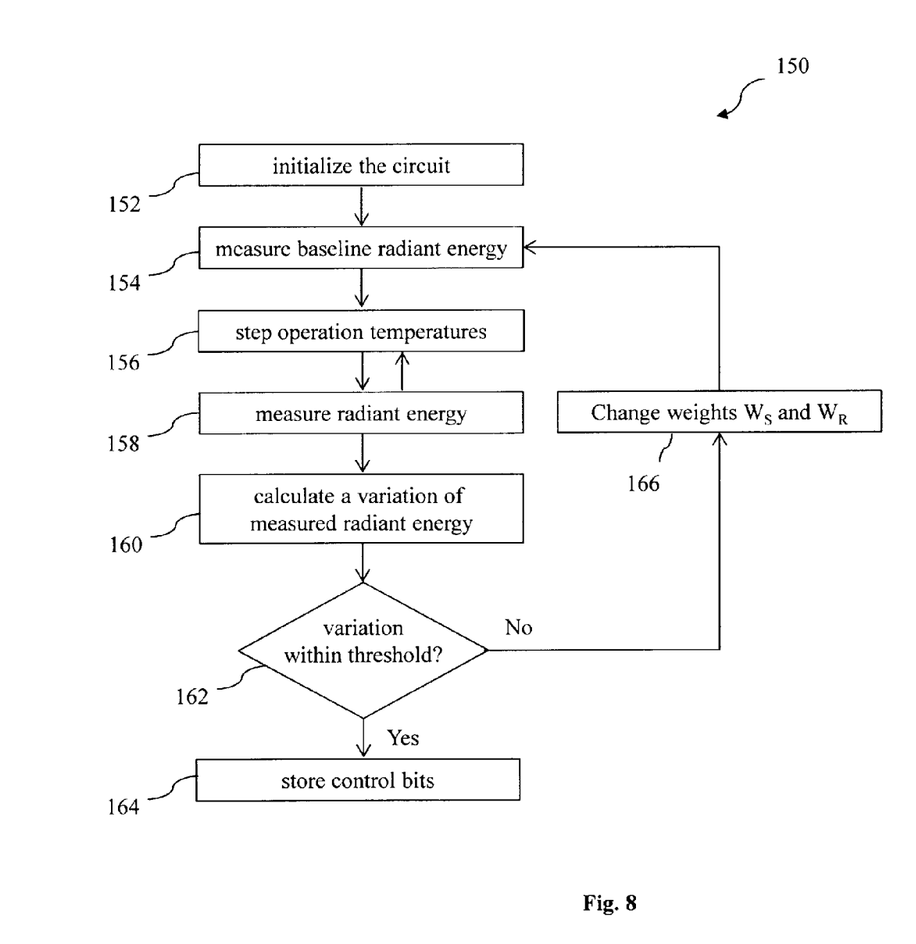
FIG. 8 shows a flow chart of a method of calibrating some components of the optical sensing system in FIG. 1, in accordance with an embodiment.

FIG. 7 illustrates a flow chart of a method 100 of performing temperature compensation for a given LED 12. FIG. 8 illustrates a flow chart of a method 150 of calibrating some components of the optical sensing system 10. Each of the methods 100 and 150 may be implemented, in whole or in part, by the optical sensing system 10. It is understood that additional operations can be provided before, during, and after each of the methods 100 and 150, and some operations described can be replaced, eliminated, or moved around for additional embodiments of the methods. The methods 100 and 150 are merely examples, and are not intended to limit the present disclosure beyond what is explicitly recited in the claims.

Referring to FIG. 7, the method 100 includes operations 102, 104, 106, 108, 110, and 112. These operations are further discussed below in conjunction with FIGS. 1-6B above.

At operation 102, the method 100 provides a first current $I_S$ that increases first order linearly when ambient temperature increases (see FIGS. 1, 2A, 2B, and 6B). At operation 104, the method 100 provides a second current $I_R$ that is first order independent of ambient temperature (see FIGS. 1, 3, and 6B). At operation 106, the method 100 applies a first weight $W_S$ to the first current $I_S$, thereby producing a first weighted current $I_{WS}$ (see FIGS. 1 and 4). At operation 108, the method 100 applies a second weight $W_R$ to the second current $I_R$, thereby producing a second weighted current $I_{WR}$ (see FIGS. 1 and 4). At operation 110, the method 100 combines the first and second weighted currents $I_{WS}$ and $I_{WR}$, thereby producing a combined weighted current $I_B$ (see FIG. 1). At operation 112, the method 100 applies a derivative current $I_{LED}$ of the combined weighted current $I_B$ to a LED 12 (see FIGS. 1, 5, and 6B). In an embodiment, the derivative current $I_{LED}$ is obtained by multiplying the combined weighted current $I_B$ with an amplitude control vector $A_{CTRL}$ (see FIG. 1).

Referring to FIG. 8, the method 150 includes operations 152, 154, 156, 158, 160, 162, 164, and 166. These operations are further discussed below in conjunction with FIGS. 1-7 above. Measurement, calculation, and storing may be performed by processing logic, such as the control unit 24, executing computer-readable code to provide the functions described herein. In an embodiment, the operations 152-166 are performed with the optical sensing system 10 being placed in a temperature chamber. The temperature chamber can be controlled to set the ambient temperature for the optical sensing system 10.

At operation 152, the method 150 initializes the various components of the optical sensing system 10 (FIG. 1). In an embodiment, the operation 152 includes initializing an amplitude control vector $A_{CTRL}$. In an embodiment, this is performed as a part of calibration procedure for the LED 12 and the photodiode 14. For example, the amplitude control vector $A_{CTRL}$ may be set such that the LED 12 and the photodiode 14 work properly for desired detection sensitivity at a nominal operation temperature such as room temperature. In an embodiment, the operation 152 further includes initializing the weights $W_S$ and $W_R$, and providing an initial current $I_{LED}$ using the weights $W_S$ and $W_R$ and the various operations described in FIG. 7. Operation 152 may include initial values of the parameters set as default values that may be adjusted during method 150.

At operation 154, the method 150 measures the radiant energy output of the LED 12 as a baseline power. The operation 154 may use thermal detectors, quantum detectors, or any other suitable detectors. This measurement may be performed at a nominal operation temperature such as room temperature.

At operation 156, the method 150 sets the ambient temperature different from the nominal operation temperature. For example, this temperature may be the highest or the lowest operation temperature intended for the optical sensing system 10. In an embodiment, a temperature chamber can be controlled to set the different ambient temperatures.

At operation 158, the method 150 measures the radiant energy output of the LED 12 at the temperature set in the operation 156. In an embodiment, the method 150 may repeat the operations 156 and 158 multiple times at different selected temperatures. For example, the selected temperatures may include a highest expected operation temperature, a lowest expected operation temperature, and the nominal operation temperature. In an example, the selected temperatures include 0, 20, and 70° C. The method 150 may select other temperatures and/or use more temperature points. However, at least two temperatures are selected in this calibration procedure. The method 150 records the measured radiant energy output of the LED 12 at each of the selected temperatures.

At operation 160, the method 150 calculates a variation (e.g., a percentage of change) of the radiant energy output of the LED 12 among the selected ambient temperature points.

At operation 162, the method 150 checks if the variation is within a threshold. The threshold may be user-programmable and designed in conjunction with the detection sensitivity in the photodiode 14. For example, a user may set a threshold to be 5%. The threshold is one of factors affecting the optical sensing system 10's sensing resolution.

If the variation of the radiant energy output of the LED 12 is within the threshold, the method 150 stores the various control information into a non-volatile memory (e.g., at control unit 24 or at another appropriate place), including the amplitude control $A_{CTRL}$ and the weights $W_S$ and $W_R$. This is performed by the operation 164. When the optical sensing system 10 is powered-off and powered-on again, the stored values are automatically loaded and applied to the respective components of the system without a need of re-calibration.

If the variation of the radiant energy output of the LED 12 is outside the threshold, the method 150 changes one or both of the weights $W_S$ and $W_R$ in operation 166 and returns to the operation 154. The above operations 154, 156, 158, 160, 162, and 166 are repeated until a suitable set of weights $W_S$ and $W_R$ are found. If all weights $W_S$ and $W_R$ have been exhausted and no solution is found, the method 150 may take other actions such as replacing the LED 12 or replacing another component of the optical sensing system 10.

Although not intended to be limiting, one or more embodiments of the present disclosure provide many benefits to an optical sensing system using LEDs as the light source. As most LEDs have the characteristic that their relative radiant energy output decreases as ambient temperature increases, embodiments of the present disclosure provide circuits, system, and methods for compensating such LEDs to work under a range of temperatures. A temperature-compensated LED according to aspects of the present disclosure maintains its radiant energy output constant or near constant when temperature changes within an operation range of temperatures. This greatly improves the sensitivity of the optical sensing system. Various embodiments may be applicable to other types of light sources having temperature-dependent emitting characteristics.

In one exemplary aspect, the present disclosure is directed to a temperature compensation circuit for a light source, such as a light emitting diode (LED). The light source has a characteristic that, if a current flowing through the light source remains constant, the light source's radiant energy output decreases when ambient temperature increases. The temperature compensation circuit includes first means for sourcing a first current that increases proportional to an increase in ambient temperature. The temperature compensation circuit further includes second means for sourcing a second current that is first order independent of ambient temperature. The temperature compensation circuit further includes a weighted current adder for sourcing a third current by combining the first and second currents with first and second weights applied to the first and second currents respectively. The temperature compensation circuit further includes third means responsive to the third current for supplying a fourth current to the light source to maintain a radiant energy output of the light source constant independent of ambient temperature.

In another exemplary aspect, the present disclosure is directed to a temperature-compensated light source. The temperature-compensated light source includes a light emitting diode (LED) for generating a radiant energy output in response to a first current applied to the LED, the LED having a characteristic that the radiant energy output decreases when ambient temperature increases and the first current remains constant. The temperature-compensated light source further includes a first current source configured to generate a second current that increases first order linearly when ambient temperature increases, a second current source configured to generate a third current that is first order independent of ambient temperature, a weighted current adder configured to produce a fourth current by summing up the second and third currents with first and second weights applied to the second and third currents respectively, and a third current source responsive to the fourth current and configured to supply a temperature-compensated first current to the LED.

In yet another exemplary aspect, the present disclosure is directed to a method of compensating a light emitting diode (LED) to work under a range of ambient temperatures. The method includes providing a first current that increases first order linearly when ambient temperature increases, providing a second current that is first order independent of ambient temperature, applying a first weight to the first current, thereby producing a first weighted current, applying a second weight to the second current, thereby producing a second weighted current, and producing a third current by summing up the first weighted current and the second weighted current. The method further includes applying a fourth current to the LED in response to the third current.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A temperature compensation circuit for a light source, the light source having a characteristic that, if a current flowing through the light source remains constant, the light source's radiant energy output decreases when ambient temperature increases, the temperature compensation circuit comprising:
    first means for generating a first current that increases proportional to an increase in the ambient temperature;
    second means for generating a second current that is first order independent of the ambient temperature;
    a weighted current adder for generating a third current by combining the first and second currents with first and second weights applied to the first and second currents respectively;
    third means responsive to the third current for supplying a fourth current to the light source to maintain the radiant energy output of the light source constant independent of the ambient temperature; and
    a current multiplier coupled between the weighted current adder and the third means, the current multiplier being operative to multiply the third current with an amplitude control input.

2. The temperature compensation circuit of claim 1, wherein the first weight, the second weight, and the amplitude control input are stored as digital bits by a non-volatile memory.

3. The temperature compensation circuit of claim 1, wherein the first means includes:
    a bipolar transistor configured in forward mode, the bipolar transistor connected between a first node and a second node and providing a first voltage potential at the second node that decreases linearly when the ambient temperature increases;
    an operational amplifier having first and second input terminals and an output terminal, the first input terminal coupled to a second voltage potential that is first order independent of the ambient temperature, the second input terminal coupled to a third node;
    a current mirror that produces the first current in response to a fifth current applied thereto;
    a field effect transistor with a gate terminal coupled to the output terminal of the operational amplifier, a source terminal coupled to the third node, and a drain terminal coupled to the current mirror for providing the fifth current; and
    a first resistor coupled between the third node and the second node, a resistance value of the first resistor being first order independent of the ambient temperature.

4. The temperature compensation circuit of claim 3, wherein the second voltage potential is provided by dividing a reference voltage with second and third resistors connected in series between the reference voltage and the first node, wherein the reference voltage is first order independent of the ambient temperature, wherein resistance values of the second and third resistors are first order independent of the ambient temperature.

5. The temperature compensation circuit of claim 4, further comprising:
a bandgap voltage reference that supplies the reference voltage, wherein the reference voltage is also supplied to the second means.

6. The temperature compensation circuit of claim 3, wherein the bipolar transistor is a PNP transistor whose emitter is coupled to the second node and whose base and collector are coupled to the first node.

7. The temperature compensation circuit of claim 3, wherein the bipolar transistor is an NPN transistor whose emitter is coupled to the first node and whose base and collector are coupled to the second node.

8. A temperature-compensated light source, comprising:
a light emitting diode (LED) configured to generate a radiant energy output in response to a first current applied to the LED, the LED having a characteristic that the radiant energy output decreases when ambient temperature increases and the first current remains constant;
a first current source configured to generate a second current that increases first order linearly when the ambient temperature increases;
a second current source configured to generate a third current that is first order independent of the ambient temperature;
a weighted current adder configured to produce a fourth current by summing up the second and third currents multiplied with first and second weights respectively, wherein the first and second weights are adjustable; and
a third current source responsive to the fourth current and configured to supply a temperature-compensated first current to the LED.

9. The temperature-compensated light source of claim 8, further comprising:
a bandgap voltage reference configured to supply a same reference voltage to the first and second current sources.

10. The temperature-compensated light source of claim 8, wherein the first current source includes:
a bipolar transistor configured in forward mode, the bipolar transistor connected between a first node and a second node and configured to provide a first voltage potential at the second node that decreases first order linearly when the ambient temperature increases, wherein the first node is grounded;
a first resistor coupled between the second node and a third node, a resistance value of the first resistor being first order independent of the ambient temperature;
an operational amplifier having first and second input terminals and an output terminal, the first input terminal coupled to a second voltage potential that is first order independent of the ambient temperature, the second input terminal coupled to the third node;
a field effect transistor with a gate terminal coupled to the output terminal of the operational amplifier, a source terminal coupled to the third node, and a drain terminal configured to provide a fifth current; and
a current mirror coupled to the drain terminal of the field effect transistor and configured to produce the second current in response to the fifth current.

11. The temperature-compensated light source of claim 10, further comprising:
second and third resistors connected in series between a reference voltage and the first node, wherein the reference voltage is first order independent of the ambient temperature, wherein resistance values of the second and third resistors are first order independent of the ambient temperature, and wherein a fourth node between the second and third resistors is coupled to the first input terminal of the operational amplifier and configured to provide the second voltage potential.

12. The temperature-compensated light source of claim 10, wherein the bipolar transistor is a PNP transistor whose emitter is coupled to the second node and whose base and collector are coupled to the first node.

13. The temperature-compensated light source of claim 8, further comprising:
a current multiplier coupled between the weighted current adder and the third current source, the current multiplier configured to multiply the fourth current with a first control input.

14. The temperature-compensated light source of claim 13, wherein the first weight, the second weight, and the first control input are stored as digital bits by non-volatile memory.

15. The temperature-compensated light source of claim 8, wherein the first current source includes:
a bipolar transistor configured in forward mode, the bipolar transistor connected between a first node and a second node, wherein a first voltage potential at the second node decreases first order linearly when the ambient temperature increases; and
a resistor coupled between the second node and a third node, wherein a resistance value of the resistor and a second voltage potential at the third node are first order independent of the ambient temperature.

16. A method of compensating a light emitting diode (LED) to work under a range of ambient temperatures, the method comprising:
providing a first current that increases first order linearly when ambient temperature increases;
providing a second current that is first order independent of the ambient temperature;
multiplying the first current with a first adjustable weight, thereby producing a first weighted current;
multiplying the second current with a second adjustable weight, thereby producing a second weighted current;
producing a third current by summing up the first weighted current and the second weighted current; and
applying a fourth current to the LED in response to the third current.

17. The method of claim 16, further comprising:
measuring a radiant energy output of the LED under at least two ambient temperatures selected from the range of ambient temperatures;
calculating a variation of the radiant energy output of the LED under the at least two ambient temperatures; and
checking if the variation is within a threshold.

18. The method of claim 17, on condition that the variation is not within the threshold, further comprising:
changing values of at least one of the first and second adjustable weights; and
repeating actions of: multiplying the first current with the first adjustable weight, multiplying the second current with the second adjustable weight, producing the third current, applying the fourth current, measuring the radiant energy output of the LED, calculating the variation, and checking the variation.

19. The method of claim 17, on condition that the variation is within the threshold, further comprising:
  writing the first adjustable weight and the second adjustable weight into non-volatile memory.

20. The method of claim 16, wherein the applying of the fourth current to the LED includes multiplying the third current by a user input.

* * * * *